US011835104B2

(12) United States Patent
Mokashi et al.

(10) Patent No.: US 11,835,104 B2
(45) Date of Patent: Dec. 5, 2023

(54) DUAL-ACTING SINGLE-SPRING TWIN-TUBE SHOCK ABSORBER ASSEMBLY

(71) Applicant: Duroshox Private Limited, Maharashtra (IN)

(72) Inventors: Rajeev Mokashi, Maharashtra (IN); Anshul Goel, Maharashtra (IN)

(73) Assignee: Duroshox Private Limited, Maharashtra (IN)

( * ) Notice: Subject to any disclaimer, the term of this patent is extended or adjusted under 35 U.S.C. 154(b) by 2 days.

(21) Appl. No.: 17/587,919

(22) Filed: Jan. 28, 2022

(65) Prior Publication Data

US 2023/0036981 A1    Feb. 2, 2023

(30) Foreign Application Priority Data

Jul. 30, 2021   (IN) .............................. 202121034449

(51) Int. Cl.
    *F16F 13/00*     (2006.01)
    *F16F 9/36*      (2006.01)
(52) U.S. Cl.
    CPC ............ *F16F 13/007* (2013.01); *F16F 9/362* (2013.01)
(58) Field of Classification Search
    CPC .............................. F16F 13/007; F16F 9/362
    See application file for complete search history.

(56) References Cited

U.S. PATENT DOCUMENTS

| 6,098,966 A | 8/2000 | Latvis et al. |
| 2005/0062250 A1* | 3/2005 | Bryant ................. F16F 13/007 280/124.146 |

FOREIGN PATENT DOCUMENTS

| DE | 102008050682 A1 * | 4/2010 | ........... B60G 17/021 |
| FR | 3012371 A1 * | 5/2015 | ........... B60G 15/062 |
| KR | 0146964 B1 | 8/1998 | |
| WO | WO-2020/018532 A1 | 1/2020 | |

* cited by examiner

*Primary Examiner* — Melody M Burch
(74) *Attorney, Agent, or Firm* — Foley & Lardner LLP

(57) ABSTRACT

A dual-acting single-spring twin-tube shock absorber assembly is provided. The assembly includes at least one twin-tube shock absorber component; at least one piston rod component coaxially coupled with said twin-tube shock absorber component and configured to telescope in and out of out of the same with compression and extension stroke respectively; one helical compression spring disposed outside the outer wall of said twin-tube shock absorber component; at least one spring guide component and at least one spring actuator component which is adapted to perform the dual action of achieving compression and extension force and a neutral position at the center without preload.

8 Claims, 7 Drawing Sheets

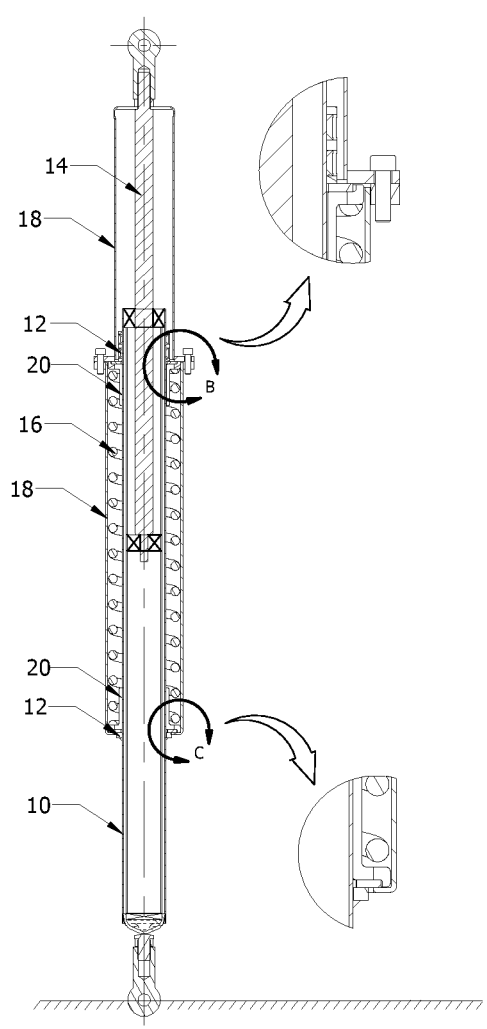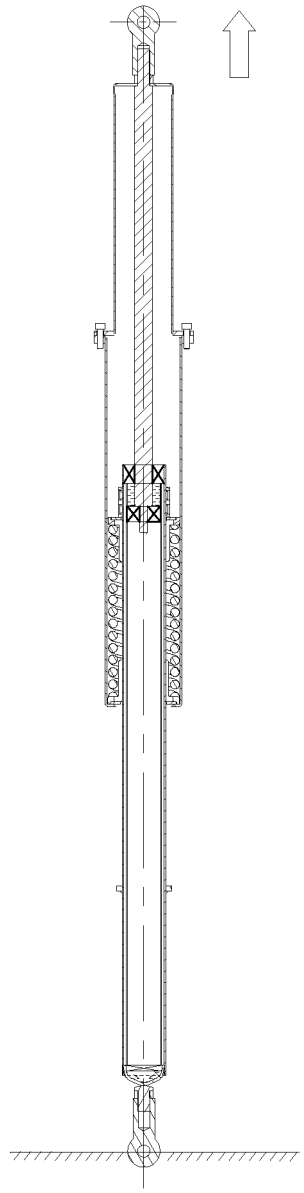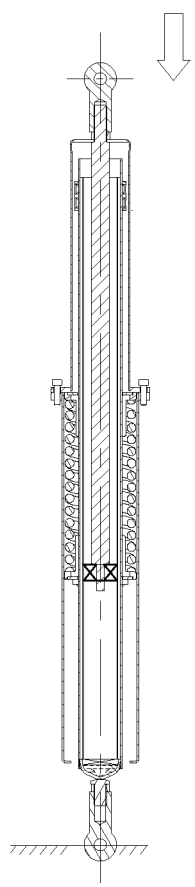
Figure 6aFigure 6bFigure 6c

DUAL-ACTING SINGLE-SPRING TWIN-TUBE SHOCK ABSORBER ASSEMBLY

CROSS-REFERENCE TO RELATED APPLICATION

The present application claims priority to Indian Provisional Patent Application No. 202121034449 filed Jul. 30, 2021, the entire contents of which are incorporated herein by reference.

FIELD

The present disclosure relates to shock absorbers. More particularly, the present disclosure relates to a dual-acting single-spring twin-tube shock absorber assembly.

BACKGROUND

Shock absorbers or dampers based on hydraulics are commonly used in mechanical devices such as passenger cars, motorcycles, trucks, tractors, engine application, other automobiles, seating applications, energy generation equipment like vacuum circuit brakers, solar trackers, windmills, aeroplanes, construction equipment and the like in order to control the impact and rebound movements. Shock absorbers being velocity sensitive, they resist the sudden vibrations by converting the kinetic energy into thermal energy which is dissipated into the atmosphere through the mechanism of heat exchange. Generally known examples of shock absorbers include twin-tube dampers, mono-tube damper and strut type shock absorbers.

A commonly used type of shock absorber is a mono tube double spring shock absorber consisting of two springs—a compression spring placed over the shock absorber body and an extension spring placed inside the shock absorber body. At neutral position compression spring and extension spring are assembled in a neutral position wherein neither spring is compressed. During the extension stroke, a piston rod moves in the upward direction resulting in compression of the extension spring by an end stopper fixed on the piston rod, while the compression spring remains in an uncompressed (free) position. During the compression stroke, the piston rod with pusher moves in the downward direction due to which the compression spring compresses against the end stopper fixed on body of shock absorber, while the extension spring remains in an uncompressed (free) condition.

One of the drawbacks of the existing shock absorbers is the requirement of two springs to achieve neutral length (zero compression force) position at the desired position of the stroke and spring compression during extension and compression stroke of the damper. This makes the shock absorber bulky and heavy and the presence of an extension spring inside the cylinder disturbs the fluid flow which results in a loss of performance of the shock absorber. Additionally, an increase in the number of components makes the shock absorbers more costly.

The inventors of the present disclosure have envisaged a dual-acting single-spring twin-tube shock absorber assembly that mitigates the afore-mentioned drawbacks.

OBJECTS

It is an object of the present disclosure to provide a dual-acting single-spring twin-tube shock absorber assembly.

It is yet another object of the present disclosure to provide a dual-acting single-spring twin-tube shock absorber assembly which is compact and light in weight.

It is still another object of present disclosure to provide a dual-acting single-spring twin-tube shock absorber assembly which is easy to assemble.

It is yet another object of the present disclosure to provide a dual-acting single-spring twin-tube shock absorber assembly with improved performance.

It is still another object of present disclosure to provide a dual-acting single-spring twin-tube shock absorber assembly which is economical.

It is yet another object of present disclosure to provide a dual-acting single-spring twin-tube shock absorber assembly which is durable as well as versatile.

SUMMARY

The present disclosure relates to a dual-acting single-spring twin-tube shock absorber assembly comprising at least one twin-tube shock absorber component with at least one internal bore comprising a first twin-tube shock absorber component end and a second twin-tube shock absorber component end; wherein at least one top stopper and at least one bottom stopper are irreversibly affixed onto the outer wall of said twin-tube shock absorber component; at least one piston rod component coaxially coupled with said twin-tube shock absorber component and comprising a first piston rod end and a second piston rod end, wherein said second piston rod end is disposed within said internal bore(s) of said twin-tube shock absorber component and is configured to telescope in and out of out of the twin-tube shock absorber component with compression and extension stroke respectively; one helical compression spring disposed outside the outer wall of said twin-tube shock absorber component, between said at least one top and bottom stopper, thereby restricting the movement of said spring therebetween during compression or extension stroke; at least one spring actuator component comprising a pusher element and a puller element, wherein a first end of said pusher element is irreversibly affixed to said first piston rod end of said piston rod and a second end of said pusher element is reversibly affixed to a first end of said puller tube; wherein the second end of said puller element is unfettered and moves longitudinally along the length of the twin-tube shock absorber component with compression and extension stroke; and at least one spring guide component disposed between said helical compression spring and said outer wall of said twin-tube shock absorber component body, wherein said spring actuator component is adapted to:
  a. achieve a neutral position at the center without preload;
  b. move in an upward direction during extension stroke thereby compressing the spring against said at least one top stopper in the upward direction; and
  c. move in a downward direction during compression stroke thereby compressing the spring against said at least one bottom stopper in the downward direction;
thereby performing the dual action of achieving compression and extension force.

BRIEF DESCRIPTION OF DRAWINGS

The present disclosure is illustrated in the accompanying non-limiting drawings, throughout which like reference letters indicate corresponding parts in the various figures.

FIGS. 6a-6c illustrate the dual-acting single-spring twin-tube shock absorber assembly (100) of the present disclosure at various positions:

FIG. 6a is the neutral position of the shock absorber assembly when there is no force;

FIG. 6b is the extended position of the shock absorber assembly, when extension force is applied during extension stroke; and FIG. 6c is the compressed position of the shock absorber assembly, when compression force is applied during compression stroke.

DESCRIPTION

Figure 1:
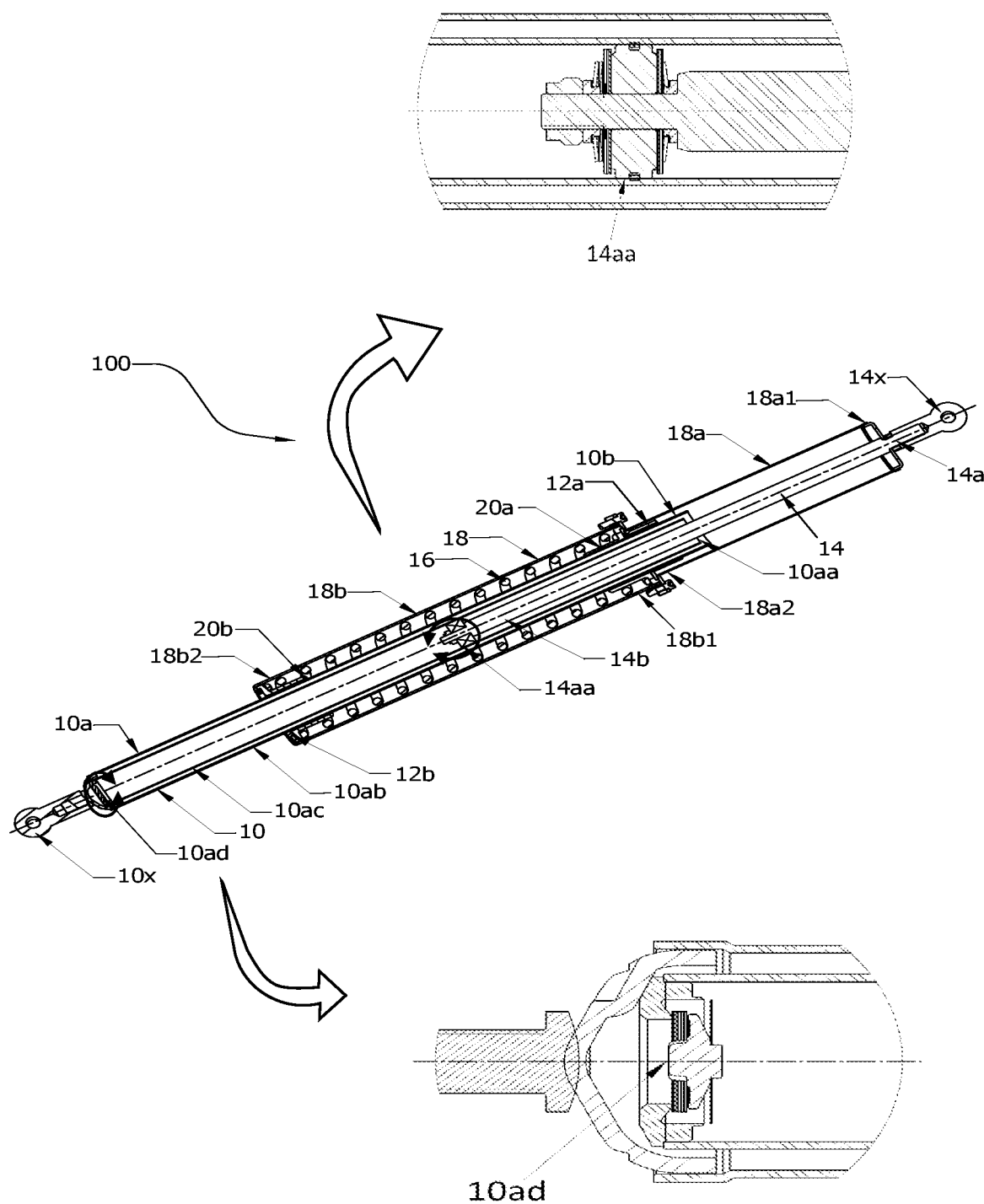
FIG. 1 illustrates a cross sectional view of the entire dual-acting single-spring twin-tube shock absorber assembly (100) of the present disclosure.

The present disclosure provides a dual-acting single-spring twin-tube shock absorber assembly (100), as illustrated in FIG. 1. The assembly (100) comprises at least one twin-tube shock absorber component (10), at least one piston rod component (14), a single helical compression spring (16), at least one spring actuator component (18) and at least one spring guide component (20) as the crucial components.

Figure 2:
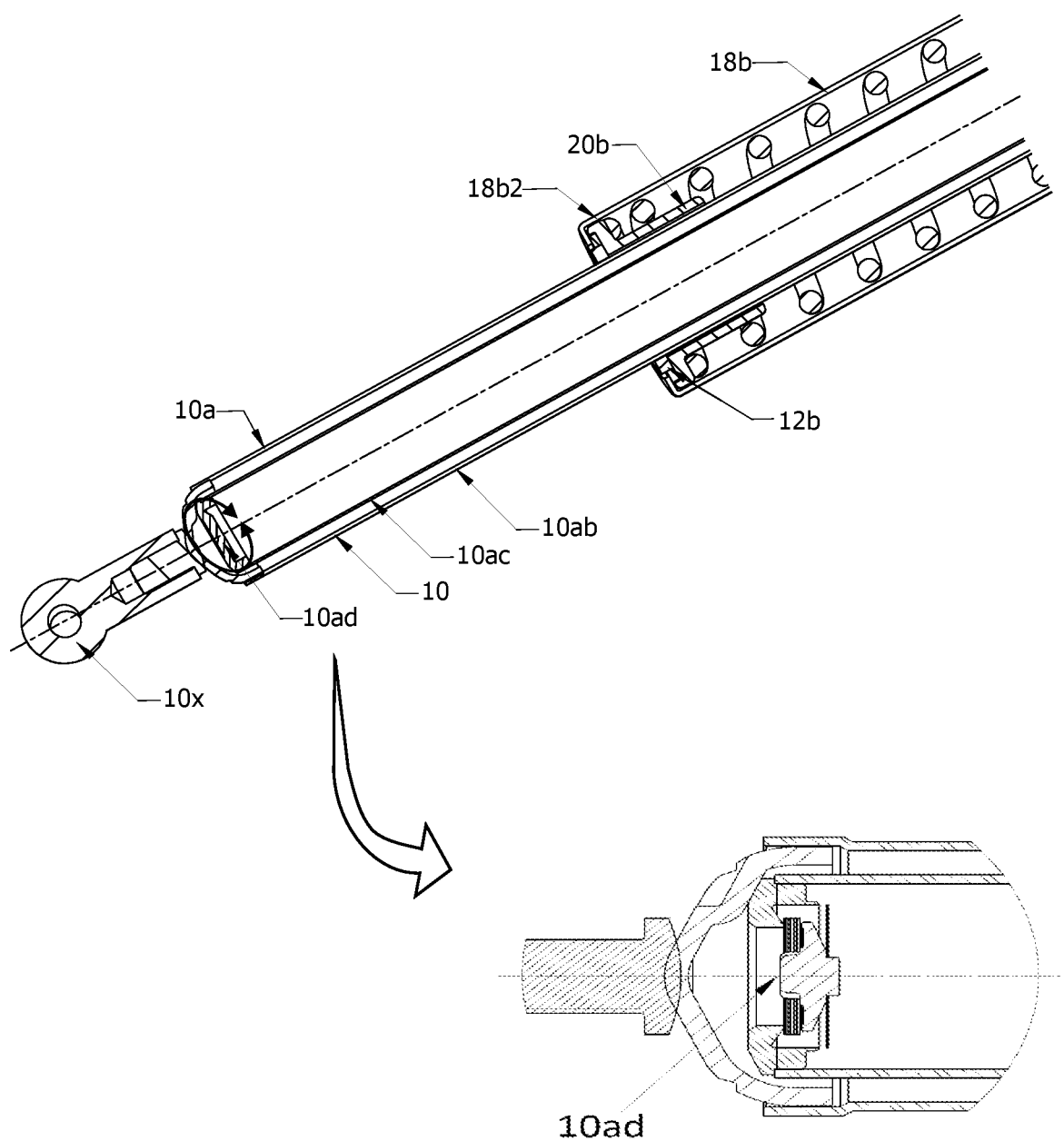
FIG. 2 illustrates a cross sectional view of the lower part of the dual-acting single-spring twin-tube shock absorber assembly (100) of the present disclosure.
Figure 3:
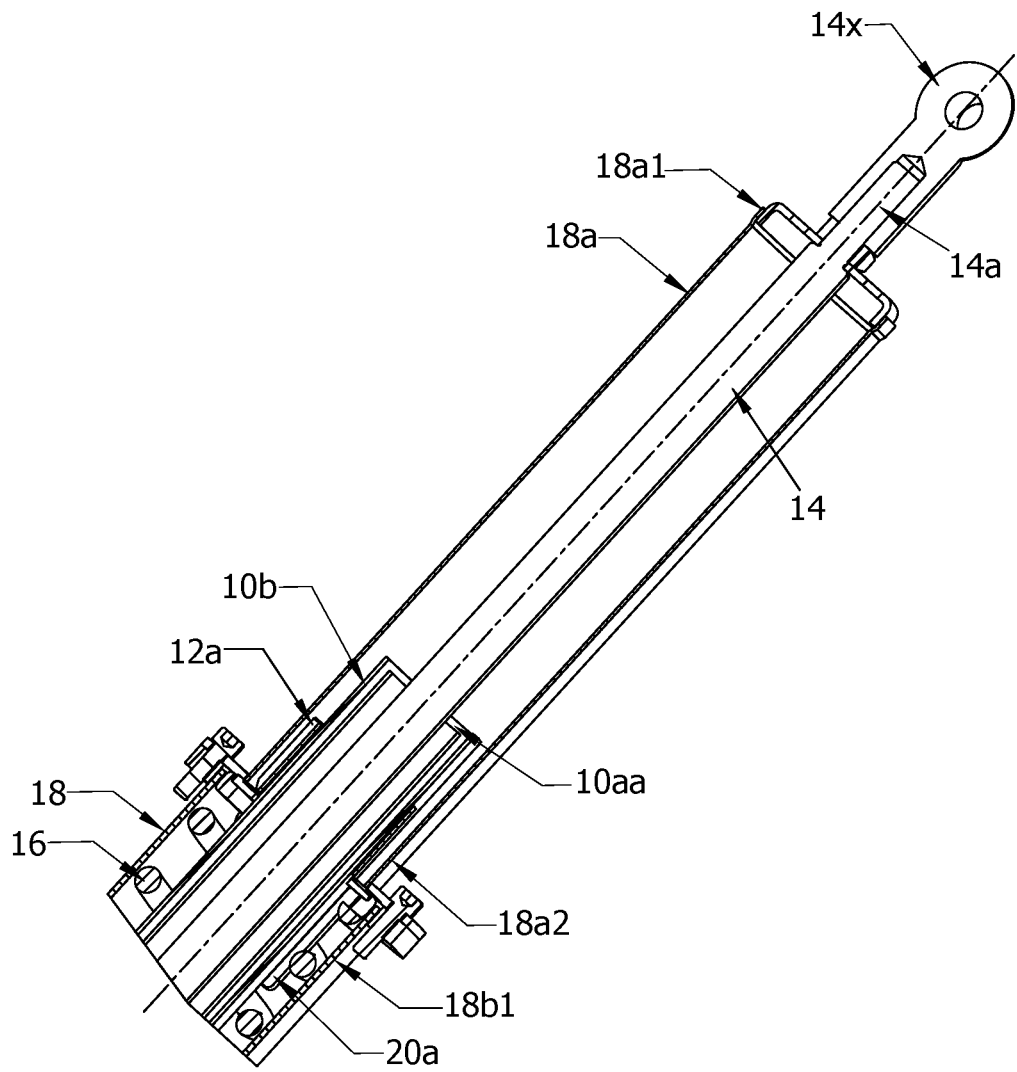
FIG. 3 illustrates a cross sectional view of the upper part of the dual-acting single-spring twin-tube shock absorber assembly (100) of the present disclosure.

The twin-tube shock absorber component (10) (illustrated in detail in FIG. 2) as the name suggests, comprises two concentrically placed hollow cylindrical tubes, the outer one with a slightly larger diameter known as the shell case (10ab) and the inner one known as the working cylinder (10ab). One end of the twin-tube shock absorber component, the first twin-tube shock absorber component end (10a), is permanently closed, creating at least one internal bore within the twin-tube shock absorber component (10) on the opposite end. The first twin-tube shock absorber component end (10a) tapers out gradually and functions as the bottom mounting (10x) of the shock absorber assembly. As illustrated in FIG. 3, the other end of the twin-tube shock absorber component, the second twin-tube shock absorber component end (10b), is sealed by at least one sealing component (10aa), to define the area within as the hydraulic fluid chamber or alternatively, the oil and gas chamber. It is important to note that there is no actual barrier between the gas and oil in the hydraulic fluid chamber. The sealing component (10aa) can be any sealing component used in hydraulics, suitable for the present purpose.

Figure 5:
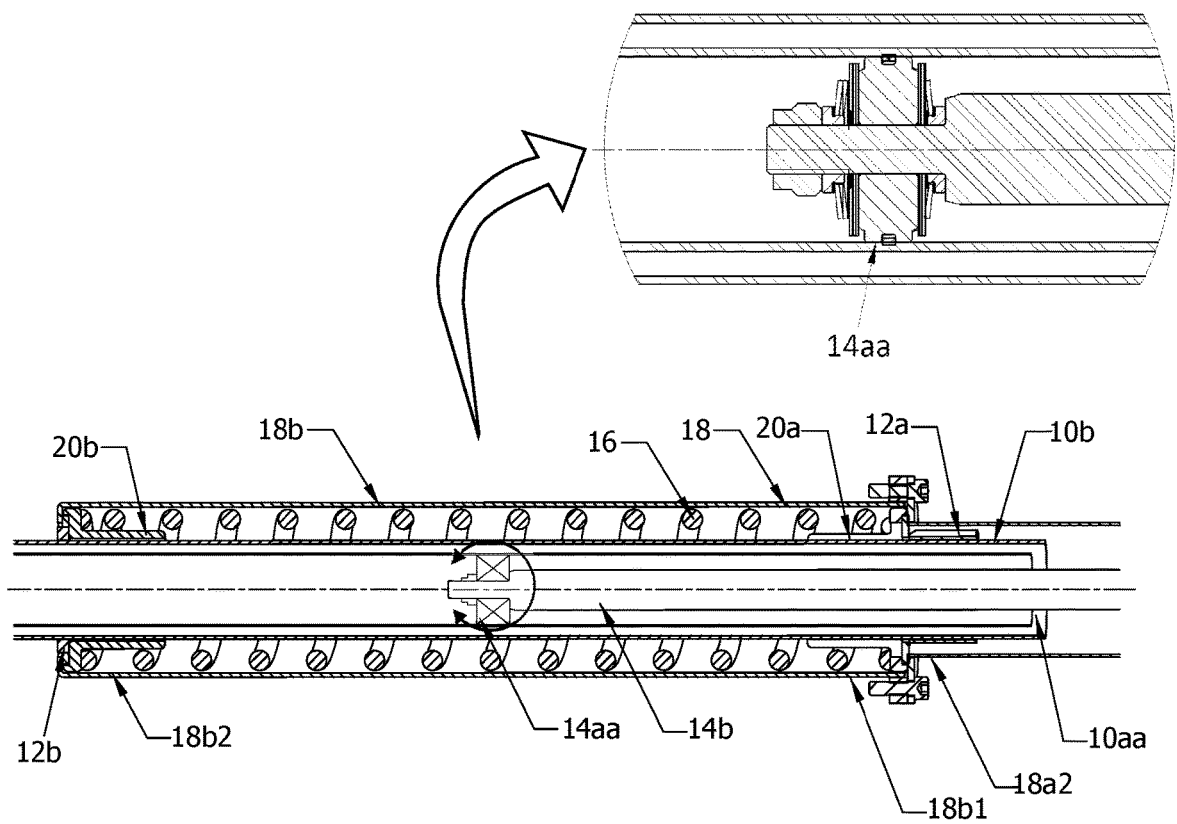
FIG. 5 illustrates a cross sectional view of the entire central part of the dual-acting single-spring twin-tube shock absorber assembly (100) of the present disclosure.
Figure 7:
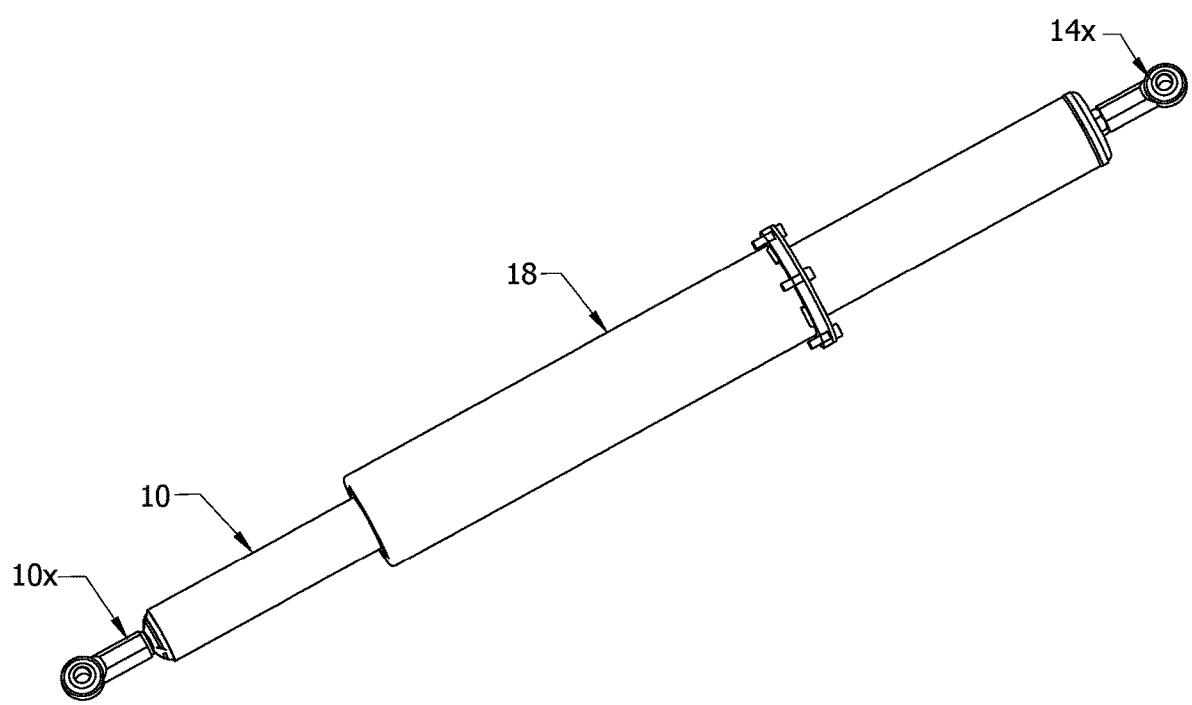
FIG. 7 illustrates the exterior view of the dual-acting single-spring twin-tube shock absorber assembly (100) of the present disclosure.

At least one piston rod component (14), illustrated in detail in FIGS. 3 and 6a-c, is coaxially coupled with the twin-tube shock absorber component (10) and comprises a first piston rod end (14a) and a second piston rod end (14b). The second piston rod end (14b) is disposed within the internal bore of the twin-tube shock absorber component (10), through the sealing component (10aa) mentioned herein above, and is configured to telescope in and out of out of the twin-tube shock absorber component (10) with compression and extension stroke respectively. The second piston rod end (14b) comprises at least one piston valve (14aa). There is also a valve at the bottom of the twin-tube shock absorber component at the first twin-tube end (10a), known as a base valve (10ad) that is illustrated in FIG. 5. The piston rod (14) moves up and down in the working cylinder (10ab) and the shell case (10ab) serves as a reservoir for the hydraulic fluid. The base valve (10ad) controls fluid flow between both the cylinders and provides some of the damping force. The piston valve (14aa) controls most of the damping. The first piston rod end (14a) of the piston rod component (14) tapers out gradually and functions as the top mounting (14x) of the shock absorber assembly (100). The bottom mounts (10x) are the fixed ends (indicated by the shaded line in FIGS. 6a-6c) and the top mounts (14x) on the opposite side of the assembly (100) are the moving ends.

Figure 4A:
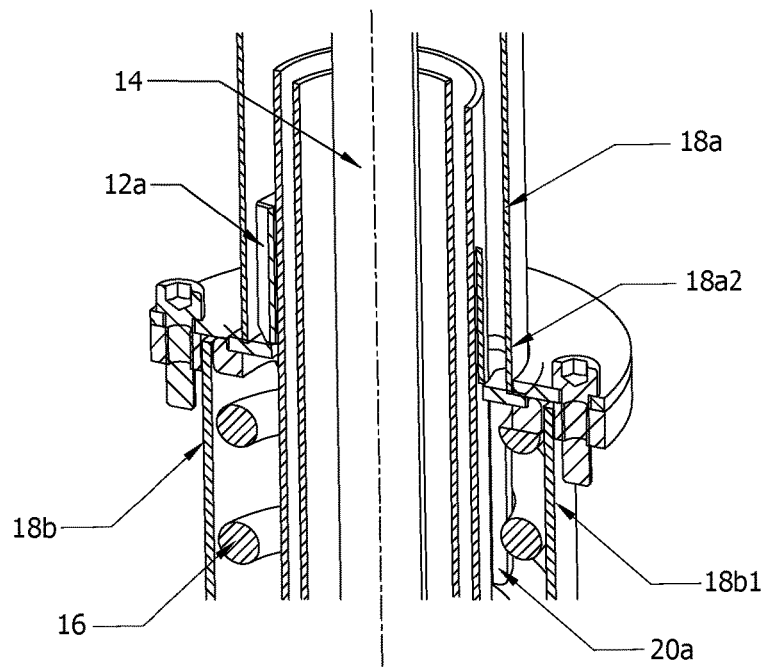
FIGS. 4a and 4b illustrate a cross sectional view of the top and bottom portion of the central part of the dual-acting single-spring twin-tube shock absorber assembly (100) of the present disclosure, respectively.
Figure 4B:
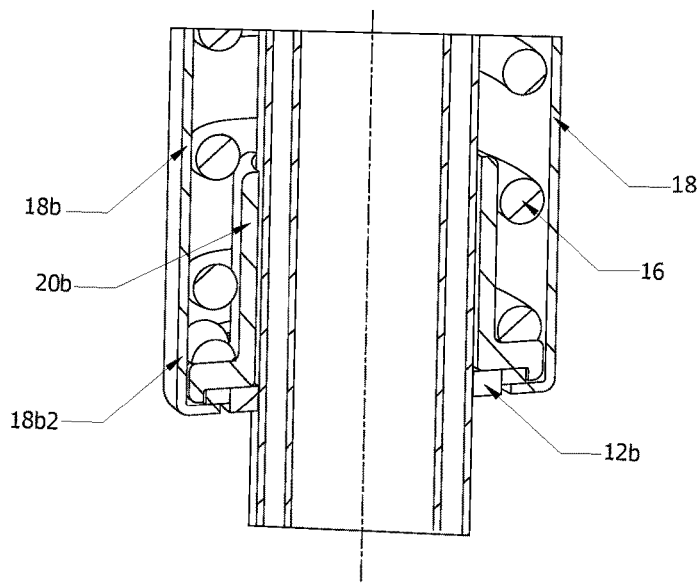

It is a characteristic of the present disclosure that at least one top stopper (12a) and at least one bottom stopper (12b) are irreversibly affixed onto the outer wall of the shell case (10ab) of the twin-tube shock absorber component (10) by at least one method selected from the group consisting of welding and fastening (illustrated in detail in FIGS. 4a-4b).

As illustrated in FIG. 5, the shock absorber assembly of the present disclosure comprises one helical compression spring (16) that is disposed outside the outer wall of the shell case (10ab) of the twin-tube shock absorber component (10), between the top (12a) and bottom stopper (12b). The movement of the spring (16), during compression or extension stroke, is restricted between the two stoppers (12). The afore-mentioned construction of the spring (16) is extremely crucial to the performance and capacity of the shock absorber assembly (100), as detailed subsequently in the description. It is significant to note that the helical compression spring (16) of the present assembly (100) is not preloaded and it has a 'zero load' neutral position. Preloading of spring is a basic requirement of most of the prior art assemblies and threshold of preload needs to be defined.

It is a characteristic of the assembly (100) of the present disclosure that, at least one spring actuator component (18), comprising a pusher element (18a) and a puller element (18b), is present in the shock absorber assembly (100) of the present disclosure (construction and working illustrated in detail in FIGS. 1 and 6a-c). The first end (18a1) of the pusher element (18a) is irreversibly affixed to the first piston rod end (14a) of the piston rod (14) and the second end (18b2) of the pusher element (18a) is affixed to the first end (18b1) of the puller element (18b) by any method of assembly typically used for the present purpose. In one embodiment, the second end (18a2) of the pusher element (18a) is affixed to the first end (18b1) of the puller element (18b) by fastening. The second end (18b2) of the puller element (18b) is unfettered and moves longitudinally along the length of the twin-tube shock absorber component (10) with compression and extension stroke.

As illustrated in detail in FIG. 6a, at free position, the helical compression spring (16) is in an uncompressed condition. Since the resisting force is zero, the second end (18a2) of the pusher element (18a) just touches the top side of the spring (16) and the first end (18b1) of the puller element (18b) just touches the bottom side of the spring (16). During extension, as detailed in FIG. 6b, when the piston rod component (14) extends, the spring actuator component (18) moves in the upward direction. Thus, the puller element (18b) compresses the spring (16) against the top stopper (12a) in the upward direction. Hence spring compression is achieved in the extension stroke. During compression, as illustrated in FIG. 6c, as the piston rod component (14) is pushed in downward direction, the spring actuator component (18) moves in the downward direction. Thus, pusher element (18a) compresses the helical compression spring (16) against the bottom stopper (12b) in the downward direction. Hence, spring compression is achieved in the compression stroke. Thus, it is a characteristic of the present shock absorber assembly (100) that, a single spring (16) is used to achieve compression and extension force, by spring compression in extension as well as compression stroke of the shock absorber assembly (100). Furthermore, by using a single spring (16), neutral position where spring force is zero can be achieved.

The shock absorber assembly (100) of the present disclosure comprises at least one spring guide component (20) disposed between the helical compression spring (16) and the outer wall of the twin-tube shock absorber component body (illustrated in detail in FIG. 5). The spring guide component (20) comprises a top spring guide element (20a) and a bottom spring guide element (20b) and is adapted to guide the helical compression spring (16) along the axis of the twin-tube shock absorber component (10) and prevent rubbing of the inside diameter of the helical compression spring (16) on the body of the twin-tube shock absorber component (10).

It is significant to note that the shock absorber assembly (100) of the present disclosure is adapted for heavy duty application, with an emphasis on vibration absorption/damping, rather than vibration isolation.

The shock absorber assembly (100) of the present disclosure distinguishes itself from the prior art by:
  employing a single compression spring (16) in a twin-tube shock absorber assembly (100) to achieve both compression and extension force, as a result of the spring (16) getting compressed during the extension as well as the compression stroke, using a single spring (16) which is also capable of achieving a neutral position where the spring force is zero;
  by placing the spring (16) outside the outer wall of the shell case (10ab) of the twin-tube shock absorber component (10) between two immovable stoppers (12) so that its movement is restricted there-between;
  by introducing an altogether independent component known as the spring actuator component (18) to influence the motion of the spring (16).

Shock Absorber for Vibration Damping (Absorption) and Not Vibration Isolation

It is significant to note that the shock absorber assembly (100) of the present disclosure is adapted for heavy duty application, with an emphasis on energy damping/vibration absorption/vibration damping, rather than vibration isolation, as is the case in most prior art cases. The shock assemblies of the prior art, functioning as vibration isolators, act by protecting a mass from shock loads, by isolating the mass from the shock and attenuating (reducing effects of) such shock loads on mass. The compression spring (16) of the present assembly, on the other hand, produces/generates forces to act on the mass that is connected to its piston rod end. Hence, the spring is not used for isolating mass in the assembly of the present disclosure. The assembly (100) of the present disclosure therefore acts by resisting force and damping vibrations. At low speeds, the assembly (100) resists or balances forces by spring and at higher speeds, it absorbs energy through damper motion.

Helical Compression Spring is Not Preloaded

It is significant to note that the helical compression spring (16) of the present assembly is not preloaded and it has a 'zero load' neutral position. Preloading of spring is a basic requirement of most of the prior art assemblies and threshold of preload needs to be defined.

Advantages of Spring (16) Placed Outside the Shock Absorber Body

Since the spring (10) is placed outside the shock absorber body (10) and not inside the cylinder tube as is often the case in the prior art, a higher spring wire diameter can be used to achieve a higher stiffness of the spring in compression and extension, without increasing shock absorber body diameter. The spring (16) thus becomes capable of absorbing a large energy, leading to a shock absorber with improved performance. Moreover, the life of the spring (16) remains is prolonged since the spring (16) is unaffected by the rising temperature of the damper oil during damping.

Advantages of Using a Twin-Tube Shock Absorber Component (10)

Since a twin-tube shock absorber is used in the present assembly, the volume of the reservoir tube or the shell case (10ab) can be decreased or increased to store less or more quantity of oil; thereby rendering it suitable for small as well as heavy duty applications; making the shock absorber assembly (100) extremely versatile. Further, since a twin-tube shock absorber component (10) is used, the possibility of oil leakage in the dusty atmosphere is rare. Still further, since the twin-tube shock absorber component (10) can hold a larger oil quantity, the temperature build up can be reduced. Even further, there is no function loss even if the shock absorber (100) is exposed to rough conditions such as exposure to stones, road debris and the like.

Advantages of Using a (Dual Acting) Single Spring (16)

Since only one spring is used, the entire shock absorber assembly (100) becomes light in weight and compact as the overall length of the shock absorber (100) and space required to accommodate the spring (16) reduces. Furthermore, since a single spring (16) performs two functions, the number of components to be included in the assembly (100) also reduce significantly along with the expenditure.

Advantages of Using a Spring Guide Component (20)

It is only the shock absorber assembly (100) of the present disclosure that uses a spring guide component (20) to guide the helical compression spring (16) along the axis of the twin-tube shock absorber component (10) and prevent rubbing of the inside diameter of the spring (16) on the body of the twin-tube shock absorber component (10). In the absence of a spring guide (20), there is a high chance of the protective paint or plating of the shell case (10ab) getting peeled off. A clearance is also maintained between the spring (16) and the outside diameter of the twin-tube shock absorber component body (10) which facilitates a smoother and frictionless movement. This is a significant difference in construction.

Ease of Production

Most of the shock absorbers of the prior art, require custom made casting to manufacture the shock absorber body. For each variation of length, new moulds are required. Tubes are used in the manufacturing of the working cylinder (10*ac*) and the shell case (10*ab*) of the present assembly (100); thereby rendering its process of manufacture—simple and scalable, which can produce multiple lengths with basic materials.

Other Differences

Even further, due to the characteristic construction of the present assembly (100), the lower portion of the shock absorber component (10) is open to atmosphere and gets cooled by air. Another differentiating feature is that the piston rod component is in the UP position and needs to be mounted in a near vertical position as the twin tube shock absorber component (10) of the present assembly it cannot work in a horizontal position.

In one embodiment, the assembly (100) of the present disclosure has a non-automobile application.

The embodiments described herein above are non-limiting. The foregoing descriptive matter is to be interpreted merely as an illustration of the concept of the present disclosure and it is in no way to be construed as a limitation. Description of terminologies, concepts and processes known to persons acquainted with technology has been avoided for the sake of brevity.

TECHNICAL ADVANTAGES AND ECONOMIC SIGNIFICANCE

The technical advantages and economic significance of the shock absorber assembly (100) of present disclosure include but are not limited to:

A single spring is used to achieve compression and extension force, by spring compression in extension as well as compression stroke of the shock absorber assembly.

Using a single spring, neutral position can be achieved where the spring force is zero.

Use of a single spring makes the assembly compact.

Use of a single spring reduces the overall length of the shock absorber and space required to accommodate the spring.

A since single spring performs two functions and therefore the number of components in the assembly reduces.

A single spring design is cost effective as compared to a double spring design.

Weight of a single spring design is less than that of a double spring design, further reducing costs.

Since the spring is not placed inside the working cylinder, the performance of the shock absorber is improved.

Since the spring is mounted outside the wall of the twin-tube shock absorber component, a higher spring wire diameter can be used to achieve a higher stiffness of the spring in compression and extension, without increasing shock absorber body diameter.

What is claimed is:

1. A dual-acting single-spring twin-tube shock absorber assembly (100) comprising:
   a. at least one twin-tube shock absorber component (10) with at least one internal bore comprising a first twin-tube shock absorber component end (10*a*) and a second twin-tube shock absorber component end (10*b*); wherein at least one top stopper (12*a*) and at least one bottom stopper (12*b*) are irreversibly affixed onto the outer wall of the at least one twin-tube shock absorber component;
   b. at least one piston rod component (14) coaxially coupled with the at least one twin-tube shock absorber component (10) and comprising a first piston rod end (14*a*) and a second piston rod end (14*b*), wherein the second piston rod end (14*b*) is disposed within the at least one internal bore of the at least one twin-tube shock absorber component (10) and is configured to telescope in and out of out of the at least one twin-tube shock absorber component (10) with compression and extension stroke respectively;
   c. at least one helical compression spring (16) disposed outside the outer wall of the at least one twin-tube shock absorber component (10), between the at least one top stopper (12*a*) and the at least one bottom stopper (12*b*), thereby restricting the movement of the at least one helical compression spring (16) therebetween during compression or extension stroke and is not preloaded and has a zero load neutral position;
   d. at least one spring actuator component (18) comprising a pusher element (18*a*) and a puller element (18*b*), wherein a first end of the pusher element (18*a*1) is irreversibly affixed to the first piston rod end (14*a*) of the at least one piston rod component (14) and a second end (18*a*2) of the pusher element (18*a*) is reversibly affixed to a first end (18*b*1) of the puller element (18*b*); wherein the second end (18*b*2) of the puller element (18*b*) is unfettered and moves longitudinally along the length of the at least one twin-tube shock absorber component (10) with compression and extension stroke; and
   e. at least one spring guide component (20) disposed between the at least one helical compression spring (16) and the outer wall of the at least one twin-tube shock absorber component (10) body,
   wherein the at least one spring actuator component (18) is adapted to:
   i. achieve a neutral position at the center without preload;
   ii. move in an upward direction during extension stroke thereby compressing the at least one helical compression spring (16) against the at least one top stopper (12*a*) in the upward direction; and
   iii. move in a downward direction during compression stroke thereby compressing the at least one helical compression spring (16) against the at least one bottom stopper (12*b*) in the downward direction;
   thereby performing the dual action of achieving compression and extension force.

2. The shock absorber assembly (100) as claimed in claim 1, wherein the first twin-tube end (10*a*) of the at least one twin-tube shock absorber component (10) is adapted to function as a bottom mounting (10*x*) of the shock absorber assembly (100) and the second twin-tube end (10*b*) of the at least one twin-tube shock absorber component (10) is sealed by at least one sealing component (10*aa*) to define the area enclosed therein as an oil and gas chamber and solely allow the entry of the second piston rod end (14*b*) there-within;

wherein the at least one twin-tube shock absorber component (10) comprises an outer shell case (10*ab*), an inner working cylinder (10*ac*) and at least one base valve (10*ad*).

3. The shock absorber assembly (100) as claimed in claim 1, wherein the first piston rod end (14*a*) of the at least one piston rod component (14) is adapted to function as a top mounting (14*x*) of the shock absorber assembly (100) and the second piston rod end (14*b*) disposed within the at least one internal bore of the at least one twin-tube shock absorber component (10) comprises at least one piston valve (14*aa*).

4. The shock absorber assembly (100) as claimed in claim 1, wherein the at least one top stopper (12*a*) and the at least one bottom stopper (12*b*) are irreversibly affixed onto the outer wall of the shell case (10*ab*) of the at least one twin-tube shock absorber component (10) by at least one method selected from the group consisting of welding and fastening.

5. The shock absorber assembly (100) as claimed in claim 1, wherein the at least one spring guide component (20) comprises a top spring guide element (20*a*) and a bottom spring guide element (20*b*).

6. The shock absorber assembly (100) as claimed in claim 1, wherein the at least one spring guide component (20) is adapted to guide the at least one helical compression spring (16) along the axis of the at least one twin-tube shock absorber component (10) and prevent rubbing of the inside diameter of the at least one helical compression spring (16) on the body of the at least one twin-tube shock absorber component (10).

7. The shock absorber assembly (100) as claimed in claim 1, being adapted to function as a vibration damper.

8. The shock absorber assembly (100) as claimed in claim 1, being adapted to resist or balance forces by means of the at least one helical compression spring (16) at low speeds and absorbs energy through the damper motion at higher speeds.

* * * * *